United States Patent
Lin et al.

(10) Patent No.: US 12,155,309 B2
(45) Date of Patent: Nov. 26, 2024

(54) ELECTRONIC CIGARETTE CHIP WITH AUTOMATIC CLOSED-LOOP CONTROL FOR OUTPUT VOLTAGE AND WORKING METHOD THEREOF

(71) Applicant: SHENZHEN HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: SHENZHEN HAPPY VAPING TECHNOLOGY LIMITED, Shenzhen (CN)

( * ) Notice: Subject to any disclaimer, the term of this patent is extended or adjusted under 35 U.S.C. 154(b) by 383 days.

(21) Appl. No.: 17/637,444

(22) PCT Filed: Aug. 12, 2020

(86) PCT No.: PCT/CN2020/108591
§ 371 (c)(1),
(2) Date: Feb. 22, 2022

(87) PCT Pub. No.: WO2021/057298
PCT Pub. Date: Apr. 1, 2021

(65) Prior Publication Data
US 2022/0278618 A1    Sep. 1, 2022

(30) Foreign Application Priority Data
Sep. 25, 2019    (CN) .......................... 201910912811.1

(51) Int. Cl.
H02M 3/158    (2006.01)
A24F 40/10    (2020.01)
(Continued)

(52) U.S. Cl.
CPC ........... *H02M 3/1582* (2013.01); *A24F 40/10* (2020.01); *A24F 40/40* (2020.01); *A24F 40/50* (2020.01)

(58) Field of Classification Search
CPC ............. H02M 3/1582; H02M 3/1584; H02M 3/1586; H02M 3/158; H02M 3/157;
(Continued)

(56) References Cited

U.S. PATENT DOCUMENTS

| | | | |
|---|---|---|---|
| 2010/0019745 A1* | 1/2010 | Keskar ................... | H03K 17/16 332/109 |
| 2011/0199062 A1* | 8/2011 | Singnurkar ......... | H02M 3/1582 323/282 |
| 2012/0062030 A1* | 3/2012 | Xu ...................... | H02M 3/1582 307/31 |

FOREIGN PATENT DOCUMENTS

| | | |
|---|---|---|
| CN | 106998808 A | 8/2017 |
| CN | 107404107 A | 11/2017 |

(Continued)

OTHER PUBLICATIONS

International Search Report of PCT Patent Application No. PCT/CN2020/108591 issued on Nov. 17, 2020.

*Primary Examiner* — Nguyen Tran (57) ABSTRACT

The electronic cigarette chip with automatic closed-loop control for output voltage and a working method thereof are provided. The chip comprises a built-in MCU module, a full bridge buck-boost module, an output voltage feedback circuit module, an operational amplifying unit module, and a plurality of signal terminals. The signal terminal VOUT serves to provide output voltage to a heating element. The output voltage feedback circuit module serves to feed output voltage of the signal terminal VOUT back to the built-in MCU module. The operational amplifying unit module serves to detect a resistance value of the heating element and (Continued)

send it to the built-in MCU module. The built-in MCU module serves to perform operations based on setting signals of the external chip and feedback signals of the output voltage feedback circuit module, and automatically control the full bridge buck-boost module, to provide precisely adjustable output voltage by the signal terminal VOUT.

10 Claims, 3 Drawing Sheets

(51) Int. Cl.
*A24F 40/40* (2020.01)
*A24F 40/50* (2020.01)

(58) Field of Classification Search
CPC .. H02M 3/156; H02M 3/1563; H02M 3/1552; A24F 40/40; A24F 40/42; A24F 40/46; A24F 40/465
See application file for complete search history.

(56) References Cited

FOREIGN PATENT DOCUMENTS

| | | |
|---|---|---|
| CN | 109805451 A | 5/2019 |
| CN | 210929647 U | 7/2020 |

* cited by examiner

ELECTRONIC CIGARETTE CHIP WITH AUTOMATIC CLOSED-LOOP CONTROL FOR OUTPUT VOLTAGE AND WORKING METHOD THEREOF

TECHNICAL FIELD

The disclosure relates to the field of electronic cigarettes, more particularly to an electronic cigarette chip with automatic closed-loop control for output voltage and a working method of the electronic cigarette chip with automatic closed-loop control for output voltage.

BACKGROUND

Existing electronic cigarettes usually heat and vaporize the electronic cigarette liquid by means of the vaporizer, to produce vapor for the smoker. Since the electronic cigarette liquid does not contain the tobacco tar, the harm to the human body is reduced. Thus, the electronic cigarettes are widely used and gradually replace tobacco cigarettes.

The power supplies of existing electronic cigarettes are internal batteries. Initially, the battery of an electronic cigarette has higher output voltage, which may result in too much vapor to be produced during using. As service time passes, the electric quantity of the battery will gradually decrease and the output voltage of the battery will keep decreasing, the amount of produced vapor will be greatly reduced then. In addition, since the heating resistor for vaporizing the electronic cigarette liquid has a resistance value which changes as the vaporizing temperature changes, the operating power of the heating resistor keeps changing as well. Consequently, during using, the amount of produced vapor is very unstable on different conditions of the battery at different vaporizing temperatures. To this end, it is desired to provide a buck-boost circuit to achieve stable supply voltage, and further adjust output voltage in real-time based on a change of the resistance value of the heating resistor to achieve stable output power for producing constant amount of vapor.

Existing electronic cigarettes usually provide output voltage for the heating element by using the pulse width modulation PWM, which changes the frequency and magnitude of output voltage by adjusting the duty ratio. However, when the battery voltage is lower than the required output voltage, it is impossible to provide the required output voltage. Further, the full bridge buck-boost circuit, which is applied in other fields, has a complicated structure and too big size to be mounted in the compact electronic cigarettes. It does not have any circuit for accurately controlling output voltage and stable output power and thus have very unstable performance. Besides, it has a high cost.

Existing electronic cigarette chips, either those merely having a current path for controlling the heating coil by a single switch transistor, or those merely having constant voltage output control, cannot achieve adjustable output voltage or constant power, and thus cannot meet actual requirements as mentioned above.

SUMMARY

Technical Problem

An object of the disclosure is to overcome the above deficiencies and provide an electronic cigarette chip with automatic closed-loop control for output voltage and a working method thereof. The electronic cigarette chip with automatic closed-loop control for output voltage can achieve precisely adjustable output voltage and constant output power by automatic closed-loop control.

Technical Solutions

The disclosure provides a technical solution as follow. The electronic cigarette chip with automatic closed-loop control for output voltage comprises a built-in MCU module, a full bridge buck-boost module, an output voltage feedback circuit module, an internal power module, an operational amplifying unit module, and several signal terminals. The full bridge buck-boost module comprises four N-channel MOS transistors and four PWM driving logic circuits. The built-in MCU module is connected with and configured to control the four PWM driving logic circuits respectively. The four PWM driving logic circuits are respectively connected with the four N-channel MOS transistors and configured to control the four N-channel MOS transistors. Herein, the first PWM driving logic circuit is further connected with the signal terminal BOOT1 and the signal terminal SW1. The fourth PWM driving logic circuit is further connected with the signal terminal BOOT2 and the signal terminal SW2. The first N-channel MOS transistor is electrically connected with the second N-channel MOS transistor. The fourth N-channel MOS transistor is electrically connected with the third N-channel MOS transistor. The first N-channel MOS transistor is further connected with an external input voltage terminal, i.e., the signal terminal VIN. The fourth N-channel MOS transistor is further connected with the signal terminal VOUT. The signal terminal VOUT serves to provide output voltage to the heating element of the electronic cigarette. The second PWM driving logic circuit, the second N-channel MOS transistor, the third N-channel MOS transistor and the third PWM driving logic circuit are respectively arranged with a port connected with the grounding terminal PGND. The output voltage feedback circuit module is configured to feed the output voltage of the signal terminal VOUT back to the built-in MCU module. The internal power module is configured to step up the input voltage of the signal terminal VIN and then supply power to the four PWM driving logic circuits. The operational amplifying unit module is configured to detect the resistance value of the heating element, generate a differential analog signal by amplification operation and send it to the built-in MCU module. The built-in MCU module is configured to generate a resistance signal by operations and send it to the external chip. The built-in MCU module performs operations with a high degree of accuracy based on setting signals of the external chip and feedback signals of the output voltage feedback circuit module, and automatically controls the full bridge buck-boost module, to provide precisely adjustable output voltage by the signal terminal VOUT.

Preferably, it may further comprise a power supply signal terminal VDD, a grounding signal terminal GND, a data communication signal terminal SDA, a communication clock signal terminal SCL, and an enable signal terminal EN, which are connected with the built-in MCU module. Herein, the data communication signal terminal SDA serves for interactive data communication between the external chip and the built-in MCU module. The setting signals of the external chip which comprise a signal of the setting value of the output voltage are sent to the built-in MCU module through the data communication signal terminal SDA and the communication clock signal terminal SCL. The enable signal terminal EN serves to input the activation signal to activate the built-in MCU module. The built-in MCU module is in a sleep state such that the output voltage of the signal terminal VOUT is zero before the built-in MCU module is activated.

Preferably, the setting value signal of the output voltage may be generated by calculations based on the resistance signal by means of the external chip.

Preferably, the built-in MCU module may comprise a PID controller. The PID controller may achieve proportional control, integral control, and differential control for the full bridge buck-boost module, to provide precisely adjustable output voltage.

Preferably, the built-in MCU module may comprise an AD analog-to-digital conversion unit. The AD analog-to-digital conversion unit may convert the analog signal into the digital signal to achieve high precision control. The bits of the AD analog-to-digital conversion unit may be greater than 12.

Preferably, it may further comprise the signal terminal IN+ and the signal terminal IN− which are connected with the operational amplifying unit module. Herein, the signal terminal IN+ is connected with the signal terminal VOUT, the signal terminal IN− is connected with one end of the heating element, and a resistor is further connected in series between the signal terminal IN+ and the signal terminal IN−.

Preferably, an inductor may be further connected in series between the signal terminal SW1 and the signal terminal SW2, a first capacitor may be connected in series between the signal terminal SW1 and the signal terminal BOOT1, and a second capacitor may be connected in series between the signal terminal SW2 and the signal terminal BOOT2.

Preferably, the signal terminal VIN may have an input voltage in a range of 2.5V-12V, and the signal terminal VOUT may have an output voltage in a range of 0V-18V.

Preferably, it may further comprise an internal circuit protection module electrically connected with the built-in MCU module, to provide overvoltage protection, under-voltage protection, overcurrent protection, and over-temperature protection, for internal circuits of the chip.

The disclosure provides another technical solution as follow. The working method of the electronic cigarette chip with automatic closed-loop control for output voltage comprises steps as follows.

(1) Setting initial relative parameters;
(2) Providing input voltage for the chip through the signal terminal VIN;
(3) By means of the built-in MCU module, determining whether the enable signal terminal EN has an activation signal or not, if no, enter the standby state; if yes, go to next step;
(4) By means of the built-in MCU module, determining whether the signal terminal SDA receives the setting signals of the external chip, if yes, go to next step; if no, go back to the previous step;
(5) By means of the built-in MCU module, further determining whether the setting value signal of output voltage is received, if no, go to next step; if yes, go to step (9);
(6) By means of the built-in MCU module, further determining whether a command for querying the resistance value of the heating element is received, if yes, go to next step; if no, go back to step (4);
(7) By means of the built-in MCU module, reading the resistance parameter of the heating element detected by the operational amplifying unit module;
(8) By means of the built-in MCU module, outputting the resistance parameter to the external chip or external device through the signal terminal SDA and going back to step (4);
(9) By means of the built-in MCU module, analyzing the setting value signal of output voltage of the signal terminal SDA;
(10) Based on the analyzing result, respectively adjusting and controlling the four PWM driving logic circuits by means of the built-in MCU module, to respectively adjust and control the four N-channel MOS transistors by means of the four PWM driving logic circuits, and then providing output voltage signal through the signal terminal VOUT;
(11) By means of the output voltage feedback circuit module, feeding the output voltage signal back to the built-in MCU module;
(12) By means of the built-in MCU module, determining whether the output voltage signal matches the setting value signal of output voltage, if no, go to step (14); if yes, go to next step;
(13) No finely controlling the four PWM driving logic circuits by means of the built-in MCU module;
(14) Finely controlling the four PWM driving logic circuits by means of the built-in MCU module;
(15) Providing corresponding output voltage through the signal terminal VOUT.

Advantages

According to the electronic cigarette chip with automatic closed-loop control for output voltage of the disclosure, the chip comprises the built-in MCU module arranged with high precision AD and the output voltage feedback circuit module. Further, the built-in MCU module is arranged therein with the PID controller for adjusting the full bridge buck-boost module to achieve stepping up and stepping down and achieve PID automatic control with high precision for output voltage. In addition, it is arranged therein with the high precision operational amplifying unit for precisely detecting the resistance value of the heating element. Based on the resistance value of the heating element, the built-in MCU module can achieve adjustable output voltage of various values, achieve stable and accurate output voltage or constant output power, and thus achieve constant vaporizing amount and stable user experience during the operation of the electronic cigarette. The chip is arranged therein with the internal circuit protection module to provide automatic overvoltage protection, under-voltage protection, overcurrent protection, over-temperature protection, and the like. Due to the enable signal terminal EN arranged therein, the chip is in a sleep state which saves power and achieves low power consumption when the enable signal terminal EN does not receive the activation signal. The chip achieves automatic EMI anti-interference adjustment. In addition, the chip achieves a high integration, such that external components and member are greatly reduced. It has high work efficiency, with less amount of heat being generated. Due to the small size, the chip can be very easily mounted inside the electronic cigarette which has very small space.

DETAILED DESCRIPTION OF ILLUSTRATED EMBODIMENTS

Figure 1:
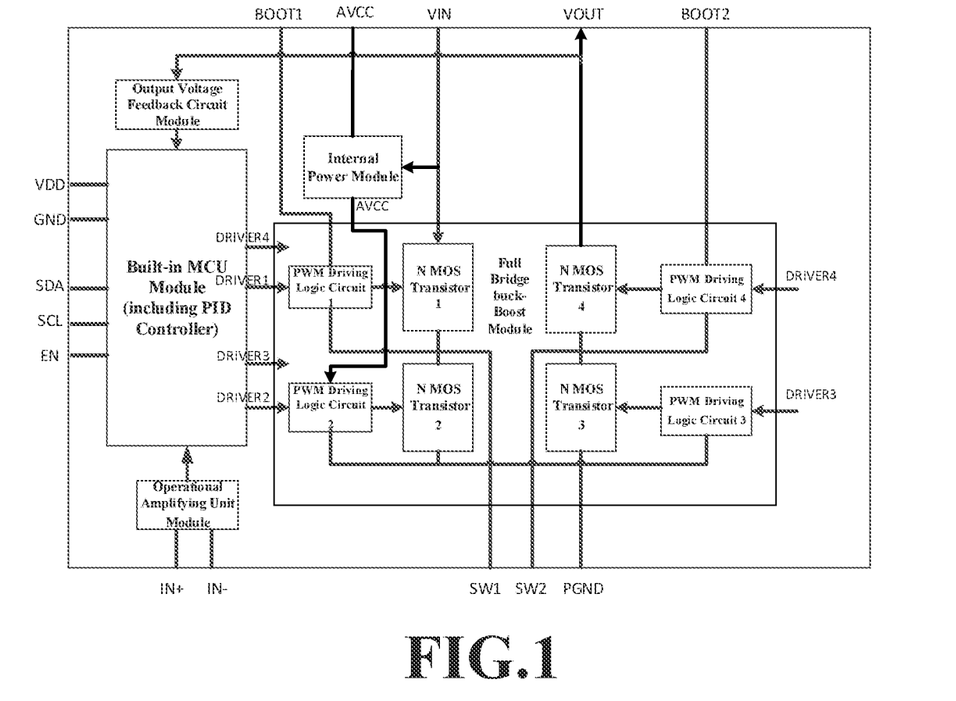
FIG. 1 is a view illustrating an internal circuit configuration of an electronic cigarette chip according to an embodiment of the disclosure.

Referring to FIG. 1, the electronic cigarette chip with automatic closed-loop control for output voltage according to the disclosure comprises a built-in MCU module (i.e., the microcontroller calculation module disposed inside the chip), a full bridge buck-boost module, an output voltage feedback circuit module, an internal power module, an operational amplifying unit module, and several signal terminals (i.e., pins of the chip). The full bridge buck-boost module comprises four N-channel MOS transistors (N MOS transistor 1, N MOS transistor 2, N MOS transistor 3, N MOS transistor 4) and four PWM driving logic circuits (PWM driving logic circuit 1, PWM driving logic circuit 2, PWM driving logic circuit 3, PWM driving logic circuit 4). The built-in MCU module is connected with and configured to control the four PWM driving logic circuits respectively by four circuits DRIVER1, DRIVER2, DRIVER3, and DRIVER4. The four PWM driving logic circuits are respectively connected with the four N-channel MOS transistors and configured to control the four N-channel MOS transistors. Herein, the first PWM driving logic circuit (PWM driving logic circuit 1) is further connected with the signal terminal BOOT1 and the signal terminal SW1. The fourth PWM driving logic circuit (PWM driving logic circuit 4) is further connected with the signal terminal BOOT2 and the signal terminal SW2. The first N-channel MOS transistor (N MOS transistor 1) is electrically connected with the second N-channel MOS transistor (N MOS transistor 2). The fourth N-channel MOS transistor (N MOS transistor 4) is electrically connected with the third N-channel MOS transistor (N MOS transistor 3). The first N-channel MOS transistor (N MOS transistor 1) is further connected with an external input voltage terminal, i.e., the signal terminal VIN. The fourth N-channel MOS transistor (N MOS transistor 4) is further connected with an external output voltage terminal, i.e., the signal terminal VOUT. The signal terminal VOUT serves to provide output voltage to the heating element of the electronic cigarette. The heating element is a heating resistor having a resistance value. The second PWM driving logic circuit (PWM driving logic circuit 2), the second N-channel MOS transistor, the third N-channel MOS transistor and the third PWM driving logic circuit (PWM driving logic circuit 3) are respectively arranged with a port connected with the grounding terminal PGND. The output voltage feedback circuit module is configured to feed the output voltage of the signal terminal VOUT back to the built-in MCU module. The internal power module is configured to step up the input voltage of the signal terminal VIN and then supply power to the four PWM driving logic circuits by the signal terminal AVCC. The operational amplifying unit module is configured to detect the resistance value of the heating element, generate a differential analog signal by amplification operation and send it to the built-in MCU module. The built-in MCU module is configured to generate a resistance signal by operations and send it to the external chip (or external device, external circuit, etc., which performs arithmetic operations, the same hereinafter). The built-in MCU module performs operations with a high degree of accuracy based on setting signals of the external chip and feedback signals of the output voltage feedback circuit module, and automatically controls the full bridge buck-boost module, to provide precisely adjustable and stable output voltage by the signal terminal VOUT. Further, the output voltage may be automatically adjusted based on setting signals of the external chip, and may be adjusted to a linear voltage of different values.

Referring to FIG. 1, the electronic cigarette chip with automatic closed-loop control for output voltage according to the disclosure further comprises a power supply signal terminal VDD, a grounding signal terminal GND, a data communication signal terminal SDA, a communication clock signal terminal SCL, and an enable signal terminal EN, which are connected with the built-in MCU module. Herein, the power supply signal terminal VDD serves to supply power for the built-in MCU module. The data communication signal terminal SDA serves for interactive data communication between the external chip and the built-in MCU module. The setting signals of the external chip which comprise a signal of the setting value of the output voltage are sent to the built-in MCU module through the data communication signal terminal SDA and the communication clock signal terminal SCL. The enable signal terminal EN serves to input activation signal to activate the built-in MCU module. The built-in MCU module is in a sleep state such that the output voltage of the signal terminal VOUT is zero before the built-in MCU module is activated. The signal of the setting value of the output voltage is generated by calculations based on the resistance signal and preset power value and the like by means of the external chip.

Referring to FIG. 1, the built-in MCU module comprises a PID controller. The PID controller may achieve proportional control, integral control, and differential control for the full bridge buck-boost module, to provide accurate output voltage.

The built-in MCU module comprises an AD analog-to-digital conversion unit. The AD analog-to-digital conversion unit may convert the analog signal into the digital signal to achieve high precision control. The bits of the AD analog-to-digital conversion unit may be greater than 12.

Figure 2:
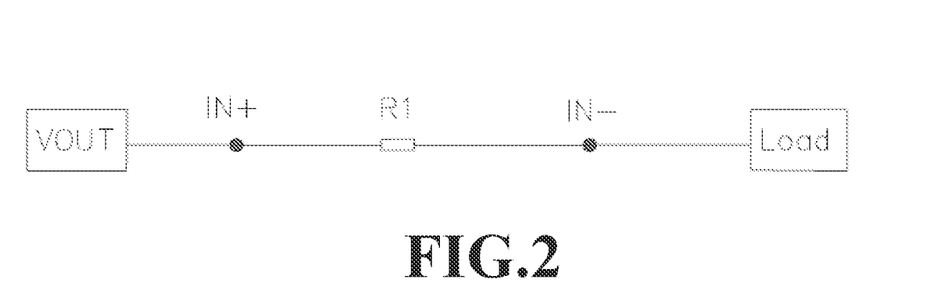
FIG. 2 is a circuit diagram illustrating a signal terminal IN+ and a signal terminal IN− of an electronic cigarette chip according to an embodiment of the disclosure.

Referring to FIGS. 1 and 2, the electronic cigarette chip with automatic closed-loop control for output voltage according to the disclosure further comprises the signal terminal IN+ and the signal terminal IN− which are connected with the operational amplifying unit module. The signal terminal IN+ is connected with the signal terminal VOUT. The signal terminal IN− is connected with one end of the heating element Load. The reference resistor R1 is connected in series between the signal terminal IN+ and the signal terminal IN−. The operational amplifying unit module has precise amplification operation function and may achieve accurate detection for the resistance value of the heating element.

Figure 3:
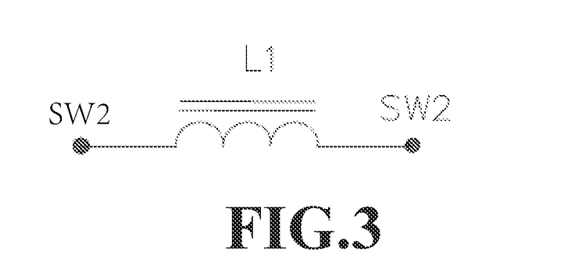
FIG. 3 is a circuit diagram illustrating a signal terminal SW1 and a signal terminal SW2 of an electronic cigarette chip according to an embodiment of the disclosure.
Figure 4:
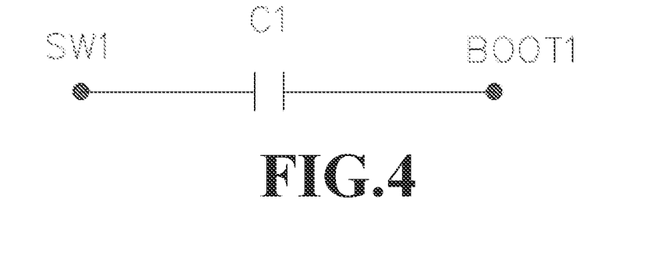
FIG. 4 is a circuit diagram illustrating a signal terminal SW1 and a signal terminal BOOT1 of an electronic cigarette chip according to an embodiment of the disclosure.
Figure 5:
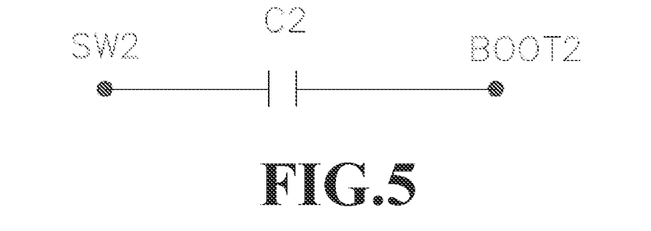
FIG. 5 is a circuit diagram illustrating a signal terminal SW2 and a signal terminal BOOT2 of an electronic cigarette chip according to an embodiment of the disclosure.

Referring to FIGS. 3, 4 and 5, in the electronic cigarette chip according to the disclosure, the inductor L1 is connected in series between the signal terminal SW1 and the signal terminal SW2. The inductor L1 serves to store and release energy to cooperate with the circuits of the full bridge buck-boost module to achieve stepping up and stepping down. The first capacitor C1 is connected in series between the signal terminal SW1 and the signal terminal BOOT1. The second capacitor C2 is connected in series between the signal terminal SW2 and the signal terminal BOOT2. The capacitors C1 and C2 serve to provide EMI electromagnetic filtering and provide shielding from electromagnetic interference. Hence, the chip may easily achieve automatic EMI anti-interference adjustment.

Referring to FIG. 1, the electronic cigarette chip with automatic closed-loop control for output voltage according to the disclosure has main working principle as follows. When the chip is not required to work, the enable signal terminal EN does not have any input of activation signal. Thus, the built-in MCU module does not work, and the signal terminal VOUT does not have any output. The chip is in the sleep state, which saves power and achieves low power consumption. When the chip is required to work, the external chip inputs the activation signal through the enable signal terminal EN, such that the built-in MCU module starts to work. In such a case, the signal terminal SDA performs two-way data signal transmission. The built-in MCU module receives new setting values of the output voltage from the external chip. The PID controller performs sequential control for the four PWM driving logic circuits. The four PWM driving logic circuits respectively control the four N-channel MOS transistors and convert the input voltage of the signal terminal VIN to the output voltage. The output voltage feedback circuit module feeds the output voltage signal back to the built-in MCU module. After the PID controller performs proportional control, integral control, and differential control, the precise output voltage can be provided. The output voltage is output to the heating element of the electronic cigarette through the signal terminal VOUT, such that the heating element of the electronic cigarette can work at stable and adjustable voltage. That is, the signal terminal VOUT can provide precisely adjustable and stable output voltage. The output voltage may be automatically adjusted based on setting signals of the external chip, and may be adjusted to a linear voltage of different values.

The above chip has the function of providing precise stable output voltage and can be applied to provide constant voltage. It also can adjust output voltage based on a change of the resistance value of the heating element, to ensure constant power of the heating element.

The operational amplifying unit, as shown in FIG. 1, detects the resistance value R of the heating element of the electronic cigarette from the signal terminal IN+ and the signal terminal IN−, processes and converts the signal of the detected resistance value R, and send it to the built-in MCU module. Then, the built-in MCU module send it to the external chip. When the heating element of the electronic cigarette works, the conversion process of vaporizing the electronic cigarette liquid into vapor needs energy. In such a case, the amount of vapor to be produced depends on the power. The greater the power, the greater the amount of vapor, and vice versa. When the heating element of the electronic cigarette works at high temperature, the resistance value R may change. As the heating element's power $P=U^2/R$, the power will be changed when the resistance value R is changed while the voltage U is not changed. To make sure the amount of vapor produced by the heating element of the electronic cigarette keeps stable, it is necessary to keep the power unchanged. To keep the power unchanged, it is necessary to adjust the output voltage U.

According to the principle, the external chip calculates new setting value U of the output voltage based on the resistance value R detected in real time, and sends it to the built-in MCU module through the signal terminal SDA. The built-in MCU module adjusts the full bridge buck-boost module by means of the PID controller, such that new output voltage U can be output through the signal terminal VOUT to keep the power P unchanged and keep the amount of vapor stable.

Referring to FIG. 1, the signal terminal VIN of the disclosure preferably has an input voltage in a range of 2.5V-12V, the signal terminal VOUT preferably has an output voltage in a range of 0V-18V, and preferably has an output current in a range of 0 A-8 A.

Figure 6:
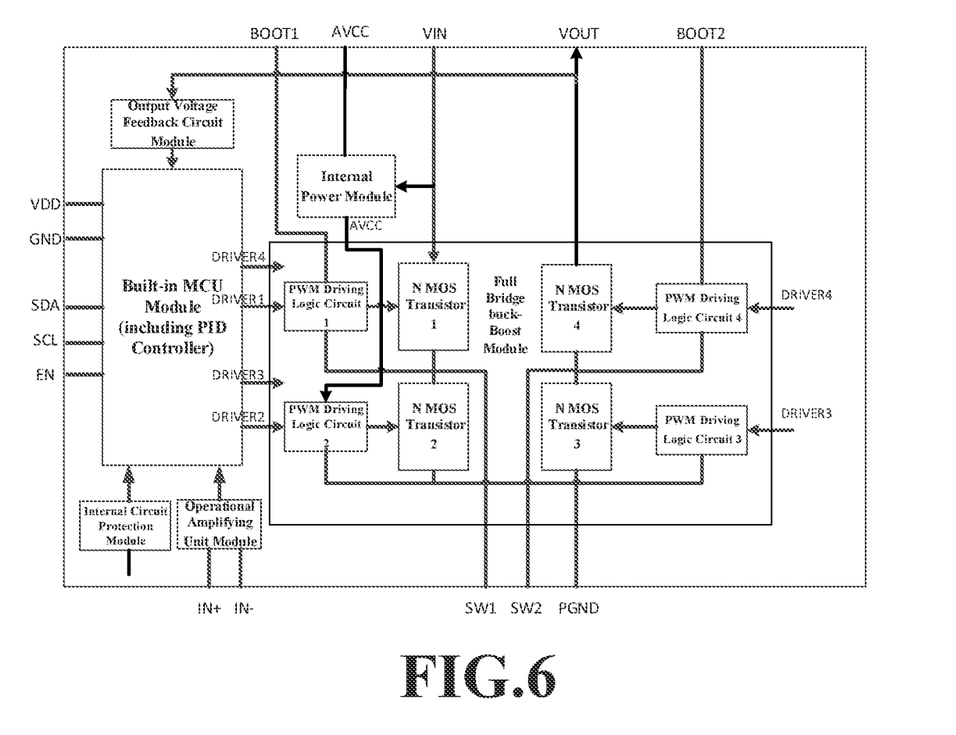
FIG. 6 is a view illustrating an internal circuit configuration of an electronic cigarette chip according to another embodiment of the disclosure.

Referring to FIG. 6, the electronic cigarette chip with automatic closed-loop control for output voltage according to another embodiment of the disclosure further comprises an internal circuit protection module electrically connected with the built-in MCU module, to provide overvoltage protection, under-voltage protection, overcurrent protection, short-circuit protection, over-temperature protection, and the like, for internal circuits of the chip, and prevent chip damage.

The chip has tiny internal components and achieves a high integration, such that external components and member are greatly reduced. It has high work efficiency, with less amount of heat being generated. Due to the small size, the chip can be very easily mounted inside the electronic cigarette which has very small space.

Figure 7:
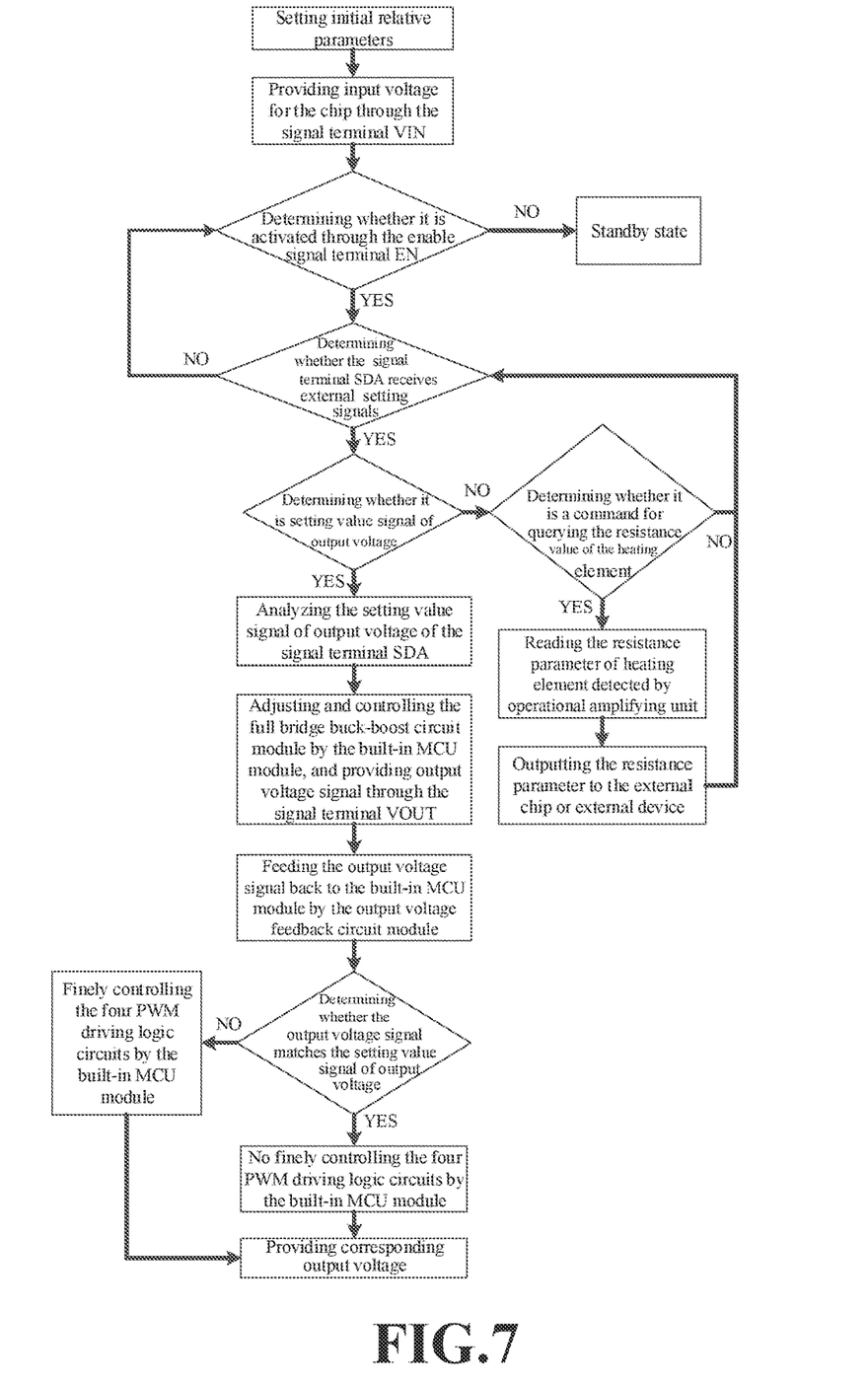
FIG. 7 is a flow chart of a working method of an electronic cigarette chip according to an embodiment of the disclosure.

Referring to FIG. 7, a working method of the electronic cigarette chip with automatic closed-loop control for output voltage comprises steps as follows.
(1) Setting initial relative parameters, including initializing setting signals of the external chip, initializing control logic of N MOS transistors, initializing resistance detection of the operational amplifying unit module, etc.;
(2) Providing input voltage for the chip through the signal terminal VIN;
(3) By means of the built-in MCU module, determining whether the enable signal terminal EN has an activation signal or not, if no, enter the standby state; if yes, go to next step;
(4) By means of the built-in MCU module, determining whether the signal terminal SDA receives the setting signals of the external chip, if yes, go to next step; if no, go back to the previous step;
(5) By means of the built-in MCU module, further determining whether the setting value signal of output voltage is received, if no, go to next step; if yes, go to step (9);
(6) By means of the built-in MCU module, further determining whether a command for querying the resistance value of the heating element is received, if yes, go to next step; if no, go back to step (4);
(7) By means of the built-in MCU module, reading the resistance parameter of the heating element detected by the operational amplifying unit module;
(8) By means of the built-in MCU module, outputting the resistance parameter to the external chip or external device through the signal terminal SDA and going back to step (4);

(9) By means of the built-in MCU module, analyzing the setting value signal of output voltage of the signal terminal SDA;

(10) Based on the analyzing result, respectively adjusting and controlling the four PWM driving logic circuits by means of the built-in MCU module, to respectively adjust and control the four N-channel MOS transistors by means of the four PWM driving logic circuits, and then providing output voltage signal through the signal terminal VOUT;

(11) By means of the output voltage feedback circuit module, feeding the output voltage signal back to the built-in MCU module;

(12) By means of the built-in MCU module, determining whether the output voltage signal matches the setting value signal of output voltage, if no, go to step (14); if yes, go to next step;

(13) No finely controlling the four PWM driving logic circuits by means of the built-in MCU module;

(14) Finely controlling the four PWM driving logic circuits by means of the built-in MCU module;

(15) Providing corresponding output voltage through the signal terminal VOUT.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette chip with an automatic closed-loop control for an output voltage, comprising a built-in MCU module, a full bridge buck-boost module, an output voltage feedback circuit module, an internal power module, an operational amplifying unit module, and a plurality of signal terminals, wherein the full bridge buck-boost module comprises four N-channel MOS transistors and four PWM driving logic circuits, the built-in MCU module is connected with and configured to control the four PWM driving logic circuits respectively, the four PWM driving logic circuits are respectively connected with and configured to control the four N-channel MOS transistors, wherein a first PWM driving logic circuit is further connected with a signal terminal BOOT1 and a signal terminal SW1, a fourth PWM driving logic circuit is further connected with a signal terminal BOOT2 and a signal terminal SW2, a first N-channel MOS transistor is electrically connected with a second N-channel MOS transistor, a fourth N-channel MOS transistor is electrically connected with a third N-channel MOS transistor, the first N-channel MOS transistor is further connected with a signal terminal VIN which is an external input voltage terminal, the fourth N-channel MOS transistor is further connected with a signal terminal VOUT, the signal terminal VOUT serves to provide output voltage to a heating element of the electronic cigarette, a second PWM driving logic circuit, the second N-channel MOS transistor, the third N-channel MOS transistor and a third PWM driving logic circuit are respectively arranged with a port connected with a grounding terminal PGND, the output voltage feedback circuit module is configured to feed the output voltage of the signal terminal VOUT back to the built-in MCU module, the internal power module is configured to step up an input voltage of the signal terminal VIN and then supply power to the four PWM driving logic circuits, the operational amplifying unit module is configured to detect a resistance value of the heating element, generate a differential analog signal by an amplification operation and send the differential analog signal to the built-in MCU module, the built-in MCU module is configured to generate a resistance signal by operations and output the resistance signal, and the built-in MCU module is configured to perform operations with a high degree of accuracy based on a setting signal and a feedback signal of the output voltage feedback circuit module, and automatically control the full bridge buck-boost module, to provide a precisely adjustable output voltage by the signal terminal VOUT.

2. The electronic cigarette chip with the automatic closed-loop control for the output voltage according to claim 1, further comprising a power supply signal terminal VDD, a grounding signal terminal GND, a data communication signal terminal SDA, a communication clock signal terminal SCL, and an enable signal terminal EN, which are connected with the built-in MCU module, wherein the data communication signal terminal SDA serves for interactive data communication of the built-in MCU module, the setting signal which comprises a setting value signal of the output voltage is sent to the built-in MCU module through the data communication signal SDA and the communication clock signal terminal SCL, the enable signal terminal EN serves to input an activation signal to activate the built-in MCU module, and the built-in MCU module is in a sleep state such that the output voltage of the signal terminal VOUT is zero before the built-in MCU module is activated.

3. The electronic cigarette chip with the automatic closed-loop control for the output voltage according to claim 2, wherein the setting value signal of the output voltage is generated by a calculation based on the resistance signal.

4. The electronic cigarette chip with the automatic closed-loop control for the output voltage according to claim 1, wherein the built-in MCU module comprises a PID controller for achieving a proportional control, an integral control, and a differential control for the full bridge buck-boost module to provide the precisely adjustable output voltage.

5. The electronic cigarette chip with the automatic closed-loop control for the output voltage according to claim 1, wherein the built-in MCU module comprises an AD analog-to-digital conversion unit for converting an analog signal into a digital signal to achieve a high precision control, and bits of the AD analog-to-digital conversion unit are greater than 12.

6. The electronic cigarette chip with the automatic closed-loop control for the output voltage according to claim 1, further comprising a signal terminal IN+ and a signal terminal IN− which are connected with the operational amplifying unit module, wherein the signal terminal IN+ is connected with the signal terminal VOUT, the signal terminal IN− is connected with an end of the heating element, and a resistor is further connected in series between the signal terminal IN+ and the signal terminal IN−.

7. The electronic cigarette chip with the automatic closed-loop control for the output voltage according to claim 1, wherein an inductor is further connected in series between the signal terminal SW1 and the signal terminal SW2, a first capacitor is connected in series between the signal terminal SW1 and the signal terminal BOOT1, and a second capacitor is connected in series between the signal terminal SW2 and the signal terminal BOOT2.

8. The electronic cigarette chip with the automatic closed-loop control for the output voltage according to claim 1, wherein the signal terminal VIN has an input voltage in a range of 2.5V-12V, and the signal terminal VOUT has an output voltage in a range of 0V-18V.

9. The electronic cigarette chip with the automatic closed-loop control for the output voltage according to claim 1, further comprising an internal circuit protection module, which is electrically connected with the built-in MCU module, for providing an overvoltage protection, an undervoltage protection, an overcurrent protection, and an overtemperature protection, for internal circuits of the chip.

10. A working method of an electronic cigarette chip with an automatic closed-loop control for an output voltage, comprising steps of:
  (1) setting initial relative parameters;
  (2) providing an input voltage for the chip through a signal terminal VIN;
  (3) by the means of a built-in MCU module, determining whether an enable signal terminal EN has an activation signal or not, if not, enter a standby state; if yes, go to next step;
  (4) by the means of the built-in MCU module, determining whether a signal terminal SDA receives a setting signal, if yes, go to next step; if not, go back to a previous step;
  (5) by the means of the built-in MCU module, further determining whether a setting value signal of the output voltage is received, if not, go to next step; if yes, go to step (9);
  (6) by the means of the built-in MCU module, further determining whether a command for querying a resistance value of a heating element is received, if yes, go to next step; if not, go back to step (4);
  (7) by the means of the built-in MCU module, reading a resistance parameter of the heating element detected by an operational amplifying unit module;
  (8) by the means of the built-in MCU module, outputting the resistance parameter through the signal terminal SDA and going back to step (4);
  (9) by the means of the built-in MCU module, analyzing the setting value signal of the output voltage of the signal terminal SDA;
  (10) based on analyzing result, respectively adjusting and controlling four PWM driving logic circuits by the means of the built-in MCU module, to respectively adjust and control four N-channel MOS transistors by the means of the four PWM driving logic circuits, and then providing an output voltage signal through a signal terminal VOUT;
  (11) by the means of the output voltage feedback circuit module, feeding the output voltage signal back to the built-in MCU module;
  (12) by the means of the built-in MCU module, determining whether the output voltage signal matches the setting value signal of the output voltage, if not, go to step (14); if yes, go to next step;
  (13) no finely controlling the four PWM driving logic circuits by the means of the built-in MCU module;
  (14) finely controlling the four PWM driving logic circuits by the means of the built-in MCU module;
  (15) providing the corresponding output voltage through the signal terminal VOUT.

* * * * *